United States Patent [19]

Zhong et al.

[11] Patent Number: 5,534,564

[45] Date of Patent: Jul. 9, 1996

[54] PROCESS FOR THE COLOR STABILIZATION OF AN AQUEOUS N-VINYL HETEROCYCLIC COPOLYMER SOLUTION

[75] Inventors: Yuanzhen Zhong, Wayne; Philip F. Wolf, Bridgewater, both of N.J.

[73] Assignee: ISP Investments Inc., Wilmington, Del.

[21] Appl. No.: 355,137

[22] Filed: Dec. 13, 1994

[51] Int. Cl.$^6$ ............................................. C08K 5/3415
[52] U.S. Cl. .......................... 523/340; 523/328; 523/330; 526/264
[58] Field of Search ................. 526/264; 523/340, 523/328, 330

[56] References Cited

U.S. PATENT DOCUMENTS

| | | | |
|---|---|---|---|
| 2,634,259 | 4/1953 | Ney et al. | 260/88.3 |
| 2,872,433 | 2/1959 | Glickman et al. | 260/45.7 |
| 4,320,114 | 3/1982 | Denzinger et al. | 424/80 |
| 5,126,395 | 6/1992 | End et al. | 524/801 |
| 5,319,041 | 6/1994 | Zhong et al. | 526/73 |

*Primary Examiner*—Paul R. Michl
*Assistant Examiner*—U. K. Rajguru
*Attorney, Agent, or Firm*—Marilyn J. Maue; Joshua J. Ward

[57] ABSTRACT

This invention relates to a process for the production of a substantially odorless, color stable N-vinyl heterocyclic copolymer in pure deionized water or in aqueous alcoholic solution which includes contacting an alcohol solution of the copolymer, under reduced pressure, at alcohol reflux temperature with water and a reducing agent selected from the group of a nitrogen containing borane complex, sulfurous acid and/or an alkali metal salt of sulfurous acid and recovering an aqueous, 10–80 wt. % solids solution of the copolymer having a substantially color free stability for a period of more than a year.

12 Claims, No Drawings

PROCESS FOR THE COLOR STABILIZATION OF AN AQUEOUS N-VINYL HETEROCYCLIC COPOLYMER SOLUTION

BACKGROUND OF THE INVENTION

N-vinyl lactam polymers are important components in many color sensitive systems including their use as resins for the spinning of fabrics, emulsions for fabric print pastes, dye substantivity additives and other applications where high processing temperatures are employed. These polymers are also useful in cosmetic and pharmaceutical arts where color development as well as unpleasant odors are highly objectionable. A major disadvantage associated with the use of such lactam and other N-vinyl heterocyclic copolymers is their tendency to rapidly yellow or darken upon standing or heating, which problem exists whether or not the heterocyclic vinyl monomer solution as introduced into the polymerization reactor or the alcoholic solution of the corresponding copolymeric product recovered, is initially colorless. Hence it is believed that chromophores or other color forming impurities introduced with the heterocyclic monomer are formed during polymerization and rapidly deteriorate upon standing.

Various proposals to overcome or ameliorate this problem by introducing various stabilizing agents, such as ion exchange resins, absorbants and/or oxidizing agents into the water or aqueous alcohol solutions during, before or after solvent exchange have not proven satisfactory and have not achieved long term water white color stability. Indeed, several stabilizers, optionally used with adjuvants, have additionally imparted an unpleasant odor to the end product or themselves have exhibited corrosive properties owing to acidic pH levels below 4.0, thus introducing further problems, increasing costs and/or limiting the copolymer concentration in many formulations.

Accordingly it is an object of the present invention to overcome the above problems and deficiencies associated with solutions of N-vinyl heterocyclic, particularly N-vinyl lactam copolymers in aqueous solutions.

Another object of the invention is to provide a color stable, odorless solution of an N-vinyl heterocyclic copolymer, which is normally susceptible to discoloration as well as providing an aqueous solution of said copolymers which has long term storage stability and is compatible with components of cosmetic, pharmaceutical and other formulations.

Still another object is to provide the above advantages by a commercially feasible and economically attractive process.

These and many other advantages of the invention will become apparent from the following description and disclosure.

THE INVENTION

In accordance with this invention there is provided a process for the production of a color stabilized N-vinyl heterocyclic copolymer in deionized water or aqueous alcohol solution by contacting an alcoholic solution of the copolymer with between about 0.02 and about 5 wt. %, preferably between about 0.02 and about 2 wt. %, of a stabilizing or reducing agent based on copolymer. The stabilizing agent of the invention is selected from the group of a borane complexed compound, sulfurous acid or an alkali metal salt of sulfurous acid and mixtures thereof and subjecting the resulting mixture to vacuum stripping of alcohol solvent.

The borane complexed compounds of this invention include organic or inorganic nitrogen containing compounds such as borane ammonia ($BH_3$—$NH_3$); morpholine borane optionally substituted with a lower ($C_1$ to $C_4$) alkyl group, eg. 4-ethyl morpholine borane; borane $C_1$-$C_4$ alkyl amine, eg. borane t-butyl amine ($[CH_3]_3C$—$NH_2$—$BH_3$), borane trimethyl amine; tetramethyl ammonium octahydro triborate and a silicon containing borane, e.g. silylamino borane ($SiH_3$—$BH_2$—$NH_3$). Suitable alkali metal salts of sulfurous acid include the sodium and/or potassium sulfites or bisulfites. The stabilizer of the present invention is contacted with the copolymer solution before discoloration occurs, i.e. immediately after copolymer recovery from the polymerization reactor and before any operation involving solvent exchange with deionized water for partial or complete stripping of alcohol from the copolymer solution takes place. Observance of this timely introduction of stabilizer is crucial in the recovery of a stable, substantially colorless copolymer solution having a shelf life of more than a year, since it is found that the present reducing agents function primarily as color forming inhibitors and not as a bleaching or color lightening agents for polymer solutions which already have been allowed to yellow or darken. Of the above stabilizers, the preferred species, from the standpoint of cost and availability, are the borane lower alkyl amines, e.g. borane t-butyl amine, and sodium bisulfite.

When the borane/ammonia complex is selected as the stabilizing agent, an initial release of ammonia causes an objectionable odor and produces a relatively high pH. However, when this stabilizer is added as a solution containing 0.005 to 1.0 wt. % of a weak organic acid, e.g. acetic acid based on total borane solution, these effects are minimized to acceptable levels.

The concentration of stabilizer added to the copolymer solution from the reactor or to the alcohol copolymer solution prior to solvent exchange with deionized water, is most beneficially between about 0.05 and about 0.2 wt % of copolymer, although lower or higher amounts within the above range can be used.

The N-vinyl heterocyclic monomers of the present invention are those having 3 to 6 ring carbon atoms and include N-vinyl pyrrolidone, N-vinyl imidazole, N-vinyl morpholine, N-vinyl pyridine and N-vinyl caprolactam, each of which can be optionally substituted on a carbon of the N-heterocyclic ring with lower alkyl. Suitable comonomers of the present copolymer are vinyl lower alkyl esters, eg. vinyl acetate, vinyl propionate, vinyl butyrate, methyl acrylate, ethyl acrylate; acrylonitrile; styrene and mixtures thereof.

The copolymers of this invention are desirably those containing from about 40 to about 80 wt. % of the N-vinyl heterocyclic monomer and from about 20 to about 60 wt. % of a copolymerizable vinyl monomer having a random, graft, linear or branched structure. These copolymers are further characterized as having a K value of from about 10 to about 100, corresponding to a number average molecular weight of from about 500 to about 300,000. Preferred are the copolymers having a K value of about 20–50 and a molecular weight of about 10,000–100,000. Also the preferred copolymer species of this invention are the N-vinyl pyrrolidone/vinyl acetate (VP/VA) copolymers in a weight ratio of between about 50–80 parts lactam (eg. VP) to 50–20 parts comonomer such as vinyl acetate (VA); most desirably a weight ratio of 55–70 parts VP and 45–30 parts VA which appear to be copolymers most needful of color stabilization.

The present copolymers are conventionally recovered as 10–80 wt. % solids solutions from a free radical initiated solution polymerization wherein a lower alkanol, notably ethanol, isopropyl alcohol and/or t-butanol, is employed as the solvent medium. Although the copolymer/alcohol solutions themselves are useful for many commercial applications, such as in adhesives, grooming agents, e.g. hair sprays, setting lotions, shampoos, tints, dyes and rinses, photosensitive film protectants, plant sprays, shoe and furniture polishes and decorative sprays, a great number of consumers require aqueous solutions of the copolymer. It is at this stage of solvent exchange that the greatest degree of discoloration potential exists and continuous and cumulative yellowing or darkening occurs during subsequent standing or storage. Yellowing of the alcoholic copolymer solutions is also observed but to a lesser extent than aqueous solutions of the copolymer. The demand for stable, water white solutions of the present copolymers in deionized water has been the subject of much experimentation; however none of the prior stabilization processes have produced solutions which are desirable in all respects or which exhibit stability over long periods of a year or more. It is now discovered that in order to obtain a highly desirable product, certain critical processing parameters in conjunction with stabilizer contact must be maintained during the solvent exchange operation. Only by the observance of these criteria can the aqueous copolymer solutions, having both color and odor stability of this invention, be obtained.

More specifically, the aqueous copolymer solutions of the present invention are prepared by incorporating the stabilizer immediately upon recovery of the 10–80 wt. %, preferably 50–70 wt. %, copolymeric solids in alcohol from the polymerization zone or, when solvent exchange with water is required, incorporating the stabilizer prior to the alcohol stripping operation. The stabilizer can be added either to the deionized water feed or to the alcohol solvent/copolymer mixture before stripping. Additionally it is important that the solvent exchange by alcohol stripping be performed under a vacuum at a relatively low temperature, i.e. under between about 20 and 740 mm Hg below absolute and at from about 35° to 85° C., preferably under between about 20 and about 120 mm Hg below absolute at from about 40° to about 65° C.

The solvent exchange with water can be carried out in (a) a single operation with from about 100 to 150 volume % water based on alcohol present in the copolymer mixture or (b) as a staged stripping operation using from about 50 to about 150 volume % water based on alcohol. In the latter case, the entire amount of the stabilizer can be introduced into the first stripping stage or incremental amounts of the required total can be added over several stripping stages. The water introduced between stages of vacuum distillations can be of equal amounts or can be increased or decreased in subsequent alcohol stripping stages. Since the alcohol recovered from the stripping zone or zones is substantially pure, it can be recycled to the polymerization reactor as solvent for fresh monomer feed; thus, the process can be carried out as a more economical continuous operation as well as in batch when desired. Most advantageously, the process is operated with alcohol recycle and stripping with deionized water in a volume equal or approximately equal to the volume of alcohol present in the copolymeric solution undergoing treatment. The deionized water used in the exchange is of high purity such as that obtained from deionization in a closed system where mold, organics and dust cannot contaminate the product. By observing the above conditions, long term stability of aqueous VP/VA copolymer solutions having less than 10 APHA color at a 10 wt. % solids concentration can be obtained. Similar color and odor stability is achieved for the other N-vinyl heterocyclic copolymers of this invention. If desired for further processing, the aqueous solution of the copolymer can be dried to provide stable colorless resin suitable for extrusion into filaments.

The color stability of the present VP/VA solutions, (50% solids), measured at room temperature using a Klett cell, 20×80 mm, on a Hunter Colorimeter (Model D25 P-9, exhibited no discoloration over the period of 13 months.

In addition to the copolymer solutions containing the stabilizer, between about 0.05 and about 2 wt. %, more often between about 0.1 and about 0.4 wt. %, of a buffer such as an alkali metal -acetate, -carbonate, -bicarbonate or a mono- or di- basic sodium or potassium phosphate can be included in the final copolymeric solution to insure a desirable pH within the range of 4 to 7. Other additives optionally employed in the aqueous solution of the copolymeric product include up to 5 wt. % of a preservative e.g. GERMALL®, GLYDANT® and others.

Having generally described the invention, reference is now had to the following examples which illustrate preferred embodiments but which are not to be construed as limiting to the scope of the present invention as more broadly defined above and in the appended claims.

EXAMPLE 1

A 50 wt. % solids solution of 100 g. N-vinyl pyrrolidone/vinyl acetate (VP/VA 70:30) in 100 g. of isopropyl alcohol was obtained from the nitrogen purged solution polymerization of VP and VA at 85° C. in the presence of 0.6 g. of 2,2-azobis(2-methylbutanenitrile) initiator. This solution was separated into two samples (Sample A and Sample B) of 100 g. each.

To sample A, 0.2 g. of borane-tert-butyl amine complex was added immediately after completion of the polymerization; whereas sample B was not treated with stabilizer.

Both samples were then subjected to solvent exchange with pure deionized water (less than 0.001% organics) by stripping isopropanol at 40° C. under 20 mm Hg with 50 g. of water in a rotary evaporator. The APHA color of these aqueous copolymer samples A and B was taken immediately after completion of the solvent exchange and again after 12 months storage at room temperature. These results are reported in Table 1 A.

The above example was repeated four more times except that borane-trimethyleneamine complex was substituted with other boron complex species, namely, those mentioned above.

| STABILIZER COMPLEX | SAMPLES |
|---|---|
| Borane-ammonia | C and D |
| Borane-morpholine | E and F |
| Tetramethylammonium octahydrotriborate | G and H |
| Borane-4-ethyl morpholine | I and J |

The APHA color of these samples is also reported in Table 1 A.

TABLE 1A

APHA COLOR OF VP/VA (70:30) COPOLYMER AQUEOUS SOLUTIONS (50% SOLIDS)

| | Sample | | | | | | | | | |
|---|---|---|---|---|---|---|---|---|---|---|
| | D | C | B | A | F | E | H | G | I | J |
| | Borane-Ammonia Complex* | | Borane-tertbutyl amine Complex | | Borane-morpholine Complex | | Tetramethylammonium Octahydrotriborate | | Borane 4-Ethyl morpholine Complex | |
| | no borane | 0.1 g borane | no borane | 0.1 g borane | no borane | 0.1 g borane | no borane | 0.1 g borane | no borane | 0.05 g borane |
| Initial APHA | 245 | 9.0 | 211 | 17.5 | 200 | 50.1 | 195 | 19.3 | 236 | 43.2 |
| APHA after 1 year | 414 | 11.7 | 228 | 14.3 | 242 | 32.1 | 291 | 3.4 | 292 | 73.5 |

*0.02 g. of acetic acid was added in to prevent the ammonia odor and to control pH

EXAMPLE 2

A 70:30 VP/VA copolymer 250 g in 250 g. isopropanol (50% solids) obtained by solution polymerization at 85° C. was subjected to staged deionized water solvent exchange under 10 mm Hg at increasing temperatures of from 16° C. to 23° C. The solvent exchange was repeated twice in a rotary evaporator. Each time 250 g. of water was added at the beginning and 250 g. of liquid was distilled out at the end of distillation. Before the first water addition, 0.50 g. (0.2% of the copolymer) of borane-t-butylamine complex was dissolved in water and used as a color stabilizer. No stabilizer agent was added at the second solvent exchange stage.

The above stabilized aqueous solution, containing 50% copolymer and less than 0.1% isopropanol, was colorless and odorless after 6 months storage at room temperature (initial APHA color 18.0 and final APHA color 10.2).

A similar sample of the copolymer which was not treated with stabilizing complex noticeably yellowed within a few hours after the completion of solvent exchange, with the initial APHA at 74.8. After 6 months storage at room temperature, the yellow color deepened to a APHA color of 145.

EXAMPLE 3

Newly prepared, colorless 70:30 VP/VA copolymer in isopropanol solution (containing 50% solids), obtained by solution polymerization of VP and VA in a nitrogen purged system in the presence of 2,2'-azobis(2-methyl-butanenitrile) (Vazo 67 initiator) with the amount of 0.3% of the product at about 85° C., was subjected to staged deionized water solvent exchange under the pressure of 23 to 30 mm Hg and temperature of 28° C. to 33° C. The solvent exchange was repeated twice in a rotary evaporator. Before the first distillation, 0.12 g. sodium acetate, which was used as buffer, was 0.24% of the copolymer, and 0.2 g. sodium bisulfite, which was used as color stabilizer agent (0.4% of the copolymer) were dissolved in 50 g. of deionized water. The volume of water was the same as that of isopropanol used for the copolymer solution. The water containing sodium acetate and sodium bisulfite and 100 g. of the copolymer isopropanol solution were added to a rotary evaporator. The first stage distillation lasted 50 minutes and about 50 g. of liquid was distilled out. Then another 50 g. of deionized water, in the absence of buffer or stabilizer, was added into the rotary evaporator, for the second stage solvent exchange to distill out another 50 g. of liquid. The resulting aqueous solution containing 50 g. of copolymer, 50 g. water, and less than 0.1 g. of isopropanol was recovered.

The above stabilized aqueous solution was substantially colorless and odorless after 6 months storage at room temperature, (final APHA color 38.0).

A similar sample of the copolymer which contained the same ratio of sodium acetate as buffer, but was not treated with stabilizing complex noticeably yellowed within a few hours after the completion of solvent exchange. After 6 months storage at room temperature, the yellow color was deep red and APHA color was 117. Thus, it is clear that as little as 0.4% of sodium bisulfite (based on copolymer content) to aqueous copolymeric solutions is effective in inhibiting color formation for extended periods of time.

EXAMPLE 4

Example 1 was repeated except that the solvent exchange temperature was 46° C. to 50° C., and the pressure was below 1" Hg. No sodium acetate was added as buffer. After 12 months at room temperature, the non-stabilized copolymer aqueous solution was deep yellow with an APHA color of 290; however the solution stabilized with sodium bisulfite (0.2%, based on the weight of copolymer solution containing 50% solids), having an acidic acid odor was water white with an APHA color of 18.7.

EXAMPLE 5

Example 1 was repeated except that during the solvent exchange of 100 g. VP/VA (70:30) copolymer which contained 50% solids, 0.2 g. sodium sulfite (as color stabilizer) and 0.08 g. of acetic acid (to adjust the pH) were added into the deionized water. The stabilized solution was very slightly yellow after 11 months at room temperature (APHA color of 76.6). The non-stabilized copolymer aqueous solution which was made at the same time, was deep yellow after 11 months at room temperature and had an APHA color of 387.

EXAMPLE 6

Example 1 was repeated except that during the solvent exchange of 100 g. VP/VA (70:30) copolymer which contained 50% solids, 0.5 g. sulfurous acid ($H_2SO_3$, as color stabilizer) and 0.12 g. of sodium acetate (as buffer) were added into the water. The stabilized solution was colorless with trace of yellow after 6 months at room temperature (APHA color of 61.0). The non-stabilized copolymer aqueous solution, which was made at the same time and contained the same ratio of sodium acetate, was deep yellow after 6 months at room temperature (APHA color of 235).

What is claimed is:

1. In a process for the preparation of an aqueous color stabilized 10–80% solids solution derived from the polymerization of from about 40 to about 80 wt. % of a N-vinyl heterocyclic monomer having from 3 to 6 ring carbon atoms and from about 60 to about 20 wt. % of a copolymerizable vinyl comonomer which comprises copolymerizing said monomer and comonomer in an alcohol solvent media in the presence of a free radical initiator to form a corresponding copolymer having a K value of from about 10 to about 100 in alcohol and subjecting the resulting alcohol copolymer mixture to solvent exchange with deionized water the improvement which comprises:

(a) contacting said alcohol copolymer mixture with (1) from about 50 to about 150 volume % deionized water per volume of alcohol and (2) between about 0.02 and about 5 wt. %, of a stabilizing agent selected from the group consisting of sulfurous acid, an alkali metal monosulfite or bisulfite, a nitrogen containing borane complex compound and mixtures thereof, (b) subjecting the resulting alcohol/copolymer/deionized water and stabilizer to stripping under a vacuum of from about 10 to about 740 mm Hg at a temperature below 90° C. to selectively remove said alcohol in exchange with deionized water and (c) recovering a 10 to 80% solids, aqueous solution of said copolymer which solution is stable and resistant to yellowing or darkening for a period of at least one year.

2. The process of claim 1 wherein said stripping of alcohol with deionized water solution is carried out in a staged operation wherein steps (a) and (b) are repeated and step (b) represents a first stage stripping under 20–120 mm Hg and is followed by one or more subsequent stripping stages in the absence or presence of from about 0 to about 2 wt. % of said stabilizing agent as supplement to said 0.02 to 2 wt. % amount in step (a) and effecting alcohol stripping at an increasingly higher vacuum of between about 50 and 250 mm Hg and at a lower temperature.

3. The process of claim 1 or 2 wherein at least one of the deionized water stripping solutions contains between about 0.01 and about 0.5 wt. % of a buffer to maintain a pH of from about 4 to 8.

4. The process of claim 2 wherein repeated step (a) is carried out with a volume of deionized water approximately equal to the volume of alcohol remaining in the system.

5. The process of claim 3 wherein said buffer is sodium acetate.

6. The process of claim 1 wherein said stabilizing agent is an organic boron containing compound.

7. The process of claim 6 wherein said organic boron containing compound is borane-trimethylamine complex.

8. The process of claim 6 wherein said organic boron containing compound is borane-morpholine complex.

9. The process of claim 6 wherein said organic boron containing compound is tetramethylammonium octahydrotriborate.

10. The process of claim 1 wherein said stabilizing agent is borane-ammonia complex in admixture with from about 0.005 to about 1 wt. % of a weak organic acid.

11. The process of claim 1 wherein said stabilizing agent is an alkali metal sulfite.

12. The process of claim 1 wherein said stabilizing agent is sulfurous acid.

* * * * *